US009318824B2

(12) United States Patent
Hara et al.

(10) Patent No.: US 9,318,824 B2
(45) Date of Patent: Apr. 19, 2016

(54) CONNECTING STRUCTURE FOR TERMINAL FITTING AND SUBSTRATE

(71) Applicant: YAZAKI CORPORATION, Tokyo (JP)

(72) Inventors: Terufumi Hara, Shizuoka (JP); Genki Murakoshi, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 14/406,912

(22) PCT Filed: Jul. 1, 2013

(86) PCT No.: PCT/JP2013/068013
§ 371 (c)(1),
(2) Date: Dec. 10, 2014

(87) PCT Pub. No.: WO2014/007200
PCT Pub. Date: Jan. 9, 2014

(65) Prior Publication Data
US 2015/0155645 A1 Jun. 4, 2015

(30) Foreign Application Priority Data
Jul. 3, 2012 (JP) ................................ 2012-149673

(51) Int. Cl.
*H01R 13/62* (2006.01)
*H01R 12/75* (2011.01)
*H01R 12/71* (2011.01)
(Continued)

(52) U.S. Cl.
CPC .............. *H01R 12/75* (2013.01); *H01R 12/714* (2013.01); *H01R 13/4223* (2013.01); *H01R 13/627* (2013.01)

(58) Field of Classification Search
CPC ............................ H01R 13/24; H01R 13/2421
USPC .......................................... 439/289, 700, 329
See application file for complete search history.

(56) References Cited

U.S. PATENT DOCUMENTS 3,209,308 A * 9/1965 Aquillon ............. H01R 12/714 439/289
3,436,715 A * 4/1969 Matthews ............. H01R 12/81 439/329

(Continued)

FOREIGN PATENT DOCUMENTS

EP 1 583 180 A2 10/2005
JP 54-167392 U 11/1979

(Continued)

OTHER PUBLICATIONS

International Search Report and Written Opinion of the International Search Report for PCT/JP2013/068013 dated Sep. 10, 2013.

(Continued)

*Primary Examiner* — Neil Abrams
(74) *Attorney, Agent, or Firm* — Kenealy Vaidya LLP

(57) ABSTRACT

On the circuit substrate 40, flat plate-like conductors 41 serving as external input contacts are disposed in positions against which contact portions 22 of terminal fittings 20 abut, so that electric conduction between the terminals fittings 20 and the flat plate-like conductors 41 can be obtained by abutment between the flat plate-like conductors 41 and the contact portions 22.

2 Claims, 7 Drawing Sheets

(51) Int. Cl.
*H01R 13/422* (2006.01)
*H01R 13/627* (2006.01)

(56) References Cited

U.S. PATENT DOCUMENTS

| | | | | | |
|---|---|---|---|---|---|
| 3,500,288 | A * | 3/1970 | Reed | H01R 13/2421 | 439/329 |
| 4,060,295 | A * | 11/1977 | Tomkiewicz | H01R 12/88 | 439/326 |
| 4,072,387 | A * | 2/1978 | Sochor | H01R 12/79 | 439/329 |
| 4,087,146 | A * | 5/1978 | Hudson, Jr. | H01R 12/714 | 439/493 |
| 4,417,779 | A * | 11/1983 | Wilson | H01R 12/714 | 439/325 |
| 4,533,203 | A * | 8/1985 | Feldman | H01R 12/714 | 439/626 |
| 4,640,562 | A * | 2/1987 | Shoemaker | H01R 12/79 | 439/327 |
| 4,881,901 | A * | 11/1989 | Mendenhall | H01R 12/82 | 439/260 |
| 4,948,379 | A * | 8/1990 | Evans | H01R 12/79 | 439/329 |
| 5,026,291 | A * | 6/1991 | David | H01R 12/714 | 439/493 |
| 5,199,896 | A * | 4/1993 | Mosquera | H01R 12/714 | 29/842 |
| 5,310,352 | A * | 5/1994 | Mroczkowski | H01R 13/24 | 439/289 |
| 5,540,599 | A * | 7/1996 | Bishop | H01R 13/2428 | 439/289 |
| 5,597,317 | A * | 1/1997 | Hansell, III | H01R 13/193 | 439/140 |
| 5,716,226 | A * | 2/1998 | Takahashi | H01R 12/7058 | 439/329 |
| 5,716,229 | A * | 2/1998 | Loder | H01R 12/774 | 439/493 |
| 5,762,510 | A * | 6/1998 | Taniguchi | H01R 13/5202 | 439/271 |
| 5,842,873 | A * | 12/1998 | Gonzales | H01R 24/50 | 439/329 |
| 5,941,739 | A * | 8/1999 | Yoo | G11B 5/48 | 439/700 |
| 5,980,296 | A * | 11/1999 | Mori | H01R 23/661 | 439/329 |
| 6,250,953 | B1 * | 6/2001 | Niitsu | H01R 12/79 | 439/497 |
| 6,257,912 | B1 * | 7/2001 | Boillot | H01R 9/0515 | 439/329 |
| 6,319,045 | B1 * | 11/2001 | Sawayanagi | B60K 37/02 | 439/34 |
| 6,491,552 | B2 * | 12/2002 | Horikoshi | G06F 1/1616 | 361/785 |
| 6,589,082 | B2 * | 7/2003 | Harasawa | H01R 13/2442 | 439/595 |
| 6,971,929 | B2 * | 12/2005 | Safai | H01R 13/22 | 439/852 |
| 7,066,756 | B2 * | 6/2006 | Lange | H01R 12/7017 | 439/289 |
| 7,261,579 | B2 * | 8/2007 | Ku | H01R 12/716 | 439/289 |
| 7,374,429 | B2 * | 5/2008 | Cronch | H01R 12/79 | 439/496 |
| 7,654,847 | B2 * | 2/2010 | Soubh | G01R 1/06733 | 29/743 |
| 7,726,980 | B1 * | 6/2010 | Wang | B60Q 1/0088 | 439/276 |
| 7,749,015 | B2 * | 7/2010 | Uchikawa | H01R 13/6395 | 439/362 |
| 2001/0016436 | A1 | 8/2001 | Wimmer | | |
| 2002/0020544 | A1 | 2/2002 | Okabe | | |
| 2002/0048975 | A1 | 4/2002 | Horikoshi et al. | | |
| 2002/0184759 | A1 | 12/2002 | Wimmer | | |
| 2005/0024168 | A1 | 2/2005 | Winslow et al. | | |
| 2009/0186495 | A1 | 7/2009 | Taylor | | |
| 2009/0186534 | A1 | 7/2009 | Taylor | | |
| 2014/0148030 | A1 * | 5/2014 | Makimura | H01R 13/5219 | 439/271 |
| 2015/0155645 | A1 * | 6/2015 | Hara | H01R 12/714 | 439/345 |

FOREIGN PATENT DOCUMENTS

| | | | |
|---|---|---|---|
| JP | 6-325816 | A | 11/1994 |
| JP | 10-284198 | A | 10/1998 |
| JP | 2001-6782 | A | 1/2001 |
| JP | 2002-56911 | A | 2/2002 |
| JP | 2002-124339 | A | 4/2002 |
| JP | 2002-523881 | A | 7/2002 |
| JP | 2007-507832 | A | 3/2007 |
| JP | 2011-510454 | A | 3/2011 |
| JP | 2011-108445 | A | 6/2011 |

OTHER PUBLICATIONS

Japanese Office Action for the related Japanese Patent Application No. 2012-149673 dated Dec. 8, 2015.

The extended European search report for the related European patent application No. 13813531.4 dated Jan. 22, 2016.

Japanese Office Action for the related Japanese Patent Application No. 2012-149673 dated Feb. 16, 2016.

* cited by examiner

CONNECTING STRUCTURE FOR TERMINAL FITTING AND SUBSTRATE

TECHNICAL FIELD

The present invention relates to a connecting structure for a terminal fitting and a substrate, in which a terminal fitting retained in a connector housing has electric conduction with an external input contact of a circuit substrate attached into a device casing.

BACKGROUND ART

FIG. 7 shows a connecting structure (structure of a connection portion of a substrate connector) for a terminal fitting and a substrate, which structure is disclosed in the following Patent Literature 1.

The connecting structure for a terminal fitting and a substrate disclosed in Patent Literature 1 is a structure in which a female terminal fitting (not shown) retained in a connector housing 110 has electric conduction with an external input contact 131 of a circuit substrate 130 attached into a device casing 120.

An electric wire 140 from an external power supply circuit, an external control circuit or the like is electrically connected to the female terminal fitting retained in the connector housing 110 as shown in FIG. 7.

In the connecting structure disclosed in Patent Literature 1, a substrate connector 150 for male-female engagement with the connector housing 110 is mounted on the circuit substrate 130, and a male terminal fitting 152 of the substrate connector 150 is electrically connected to a female terminal fitting of the connector housing 110 due to the engagement between the substrate connector 150 and the connector housing 110. Thus, electric conduction can be secured between the terminal fitting in the connector housing 110 and the external input contact 131.

The substrate connector 150 is provided with a cylindrical hood portion 151 into which the connector housing 110 is inserted and a terminal support portion 153 which supports the male terminal fitting 152, as shown in FIG. 7.

The male terminal fitting 152 supported by the substrate connector 150 is provided with a male terminal portion **152*a* which protrudes into the hood portion 151 so as to establish electric connection to the terminal fitting in the connector housing 110, and a soldered terminal portion 152*b* which is inserted into a through hole 132 on the circuit substrate 130 and soldered with the external input contact 131 in the surface of the circuit substrate 130**.

In the case of Patent Literature 1, an insertion hole 134 through which the connector housing 110 is inserted into the hood portion 151 is formed in the circuit substrate 130 because the substrate connector 150 is attached to the inner surface side of the circuit substrate 130.

PRIOR ART DOCUMENT

Patent Document

Patent Document 1: JP-A-2001-6782

SUMMARY OF THE INVENTION

Problems that the Invention is to Solve

However, the connecting structure for a terminal fitting and a substrate according to Patent Literature 1 needs a lot of troublesome work, including positioning work in which the soldered terminal portion **152*b* is inserted into the through hole 132 of the circuit substrate 130, soldering work in which the soldered terminal portion 152*b* is soldered, cutting work in which unnecessary parts are cut from the soldered terminal portion 152*b* having been soldered, etc., in order to mount the substrate connector 150 on the circuit substrate 130**. In the connecting structure according to Patent Literature 1, it may be therefore difficult to improve the productivity, and it may be difficult to reduce the manufacturing cost.

In addition, in the connecting structure in which terminal fittings are electrically connected to each other, it is necessary to take into consideration the occurrence of deformation caused by twisting or the like in the terminal fittings due to fitting tolerance between the hood portion 151 and the connector housing 110, mutual fitting tolerance between the terminal fittings, an assembling error, or the like. A worker who must take the occurrence of the deformation into consideration may take much labor in the work in which the terminal fittings are connected to each other.

The present invention is aimed at solving the aforementioned problems, and an object of the invention is to provide a connecting structure for a terminal fitting and a substrate, which can dispense with troublesome work for mounting a substrate connector on a circuit substrate and reduce constituent components or working steps to thereby improve the productivity or reduce the manufacturing cost, and which can prevent the terminal fitting from being deformed due to twisting or the like during connection work so that the terminal fitting can surely establish electric conduction with an external input contact of the circuit substrate.

Means for Solving the Problem

The invention consists in a connecting structure for a terminal fitting and a substrate according to the following configuration (1) or (2).

(1) A connecting structure for a terminal fitting and a substrate, in which a terminal fitting retained in a connector housing has electric conduction with an external input contact of a circuit substrate attached into a device casing, the connecting structure including:

a contact portion that is provided for butting so as to protrude in a front end portion of the terminal fitting and that is received and retained in the connector housing so as to protrude from a front end of the connector housing; and a housing engagement portion that is formed in an outer wall portion of the device casing and that positions the connector housing so that the contact portion protrudes into the device casing; wherein:

a flat plate-like conductor of the circuit substrate serving as the external input contact is disposed in the device casing so that a surface of the flat plate-like conductor abuts against the contact portion protruding from the front end of the connector housing positioned by the housing engagement portion.

(2) A connecting structure for a terminal fitting and a substrate according to the aforementioned configuration (1), wherein:

the contact portion of the terminal fitting is a part of a plate spring piece formed integrally with the terminal fitting, and is provided so that the contact portion can be elastically displaced toward a rear end portion of the terminal fitting due to elastic deformation of the plate spring piece when the contact portion abuts against the flat plate-like conductor; and the housing engagement portion of the device casing includes a hood portion and a housing lock portion, the hood portion being formed into a cylindrical structure fitted to an outer periphery of the connector housing so as to restrict an insertion direction of the connector housing in a direction substantially perpendicular to the circuit substrate, the housing lock portion being engaged with the connector housing to fix the connector housing to the device casing when the contact portion of the terminal fitting abuts against the flat plate-like conductor with a set pressure due to insertion of the connector housing into the hood portion.

According to the aforementioned configuration (1), the terminal fitting having electrical conduction with the external input contact of the circuit substrate is retained by the connector housing. The connector housing is positioned by the housing engagement portion formed in the device casing.

The terminal fitting in the connector housing positioned by the housing engagement portion of the device casing achieves electric conduction with the external input contact of the circuit substrate not in a male-female fitting manner but in such a manner that the contact portion which is provided for butting so as to protrude in the front end portion of the terminal fitting abuts against the flat plate-like conductor on the circuit substrate.

That is, according to the aforementioned configuration (1), troublesome work for mounting a substrate connector on the circuit substrate can be dispensed with and the substrate connector can be dispensed with. Accordingly, constituent components or working steps can be reduced to improve the productivity or reduce the manufacturing cost.

In addition, according to the aforementioned configuration (1), the electric connection between the terminal fitting in the connector housing and the external input contact of the circuit substrate is secured not in a male-female fitting manner which may cause twisting or the like but in a butting manner. Accordingly, in the connecting structure according to the aforementioned configuration (1), the terminal fitting can surely establish electric conduction with the external input contact of the circuit substrate without deformation caused by twisting or the like in the terminal fitting during the work of connection.

According to the aforementioned configuration (2), the housing engagement portion formed in the device casing has a hood portion for restricting the insertion direction of the connector housing in a direction substantially perpendicular to the circuit substrate. Accordingly, the contact portion at the front end of the terminal fitting retained in the connector housing can abut against the flat plate-like conductor, which serves as the external input contact on the circuit substrate, and substantially perpendicularly to the flat plate-like conductor. Thus, a stable butting state can be obtained.

In addition, the contact portion of the terminal fitting is a part of the plate spring piece formed integrally with the terminal fitting. Due to the elastic deformation of the plate spring piece at the time of the abutment, the contact portion is not affected by dimensional tolerances or assembling errors, but can contact with the flat plate-like conductor on the circuit substrate with a stable pressure.

Accordingly, stable electric connection properties can be secured.

Advantage of the Invention

According to the connecting structure for a terminal fitting and a substrate according to the invention, troublesome work for mounting a substrate connector on a circuit substrate can be dispensed with and the substrate connector can be dispensed with. Accordingly, constituent components or working steps can be reduced to improve the productivity or reduce the manufacturing cost.

In addition, according to the connecting structure for a terminal fitting and a substrate according to the invention, electric connection between a terminal fitting in a connector housing and an external input contact of the circuit substrate is secured in a butting manner. Accordingly, the terminal fitting can surely establish electric conduction with the external input contact of the circuit substrate without deformation caused by twisting or the like in the terminal fitting during the work of connection.

The invention has been described above briefly. Further, a mode for carrying out the invention (hereinafter referred to as "embodiment") will be described below. When the embodiment is read through with reference to the accompanying drawings, the details of the invention will be made clearer.

MODE FOR CARRYING OUT THE INVENTION

A preferred embodiment of a connecting structure for a terminal fitting and a substrate according to the invention will be described below in detail with reference to FIGS. 1 to 6.

Figure 1:
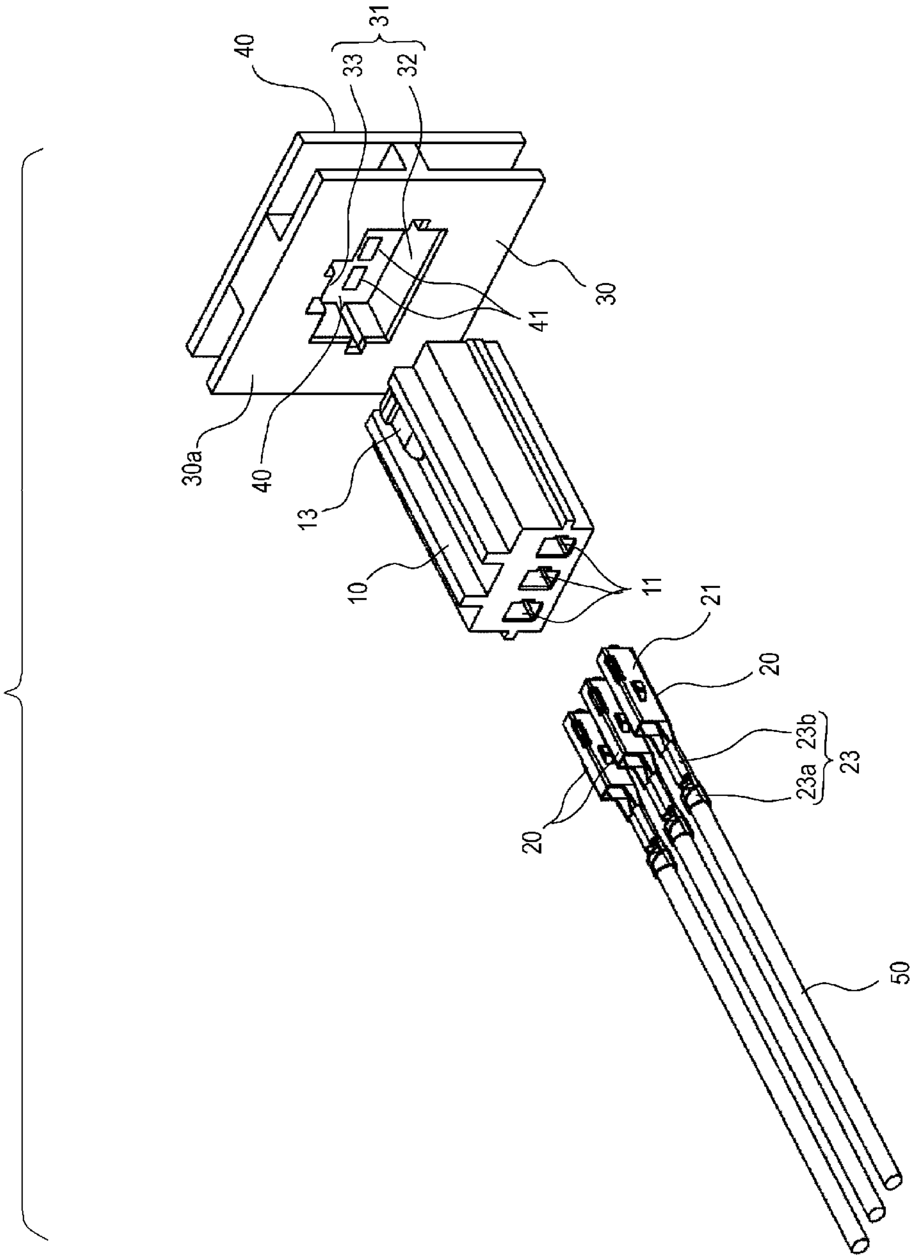
FIG. 1 is an exploded perspective view of an embodiment of a connecting structure for a terminal fitting and a substrate according to the invention.
Figure 2:
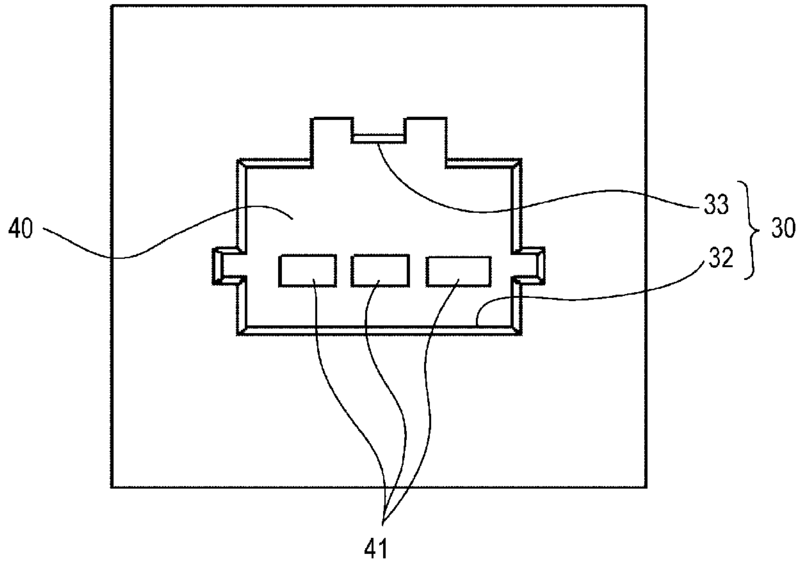
FIG. 2 is a front view of flat plate-like conductors of a circuit substrate facing a housing engagement portion of a device casing shown in FIG. 1.
Figure 3:
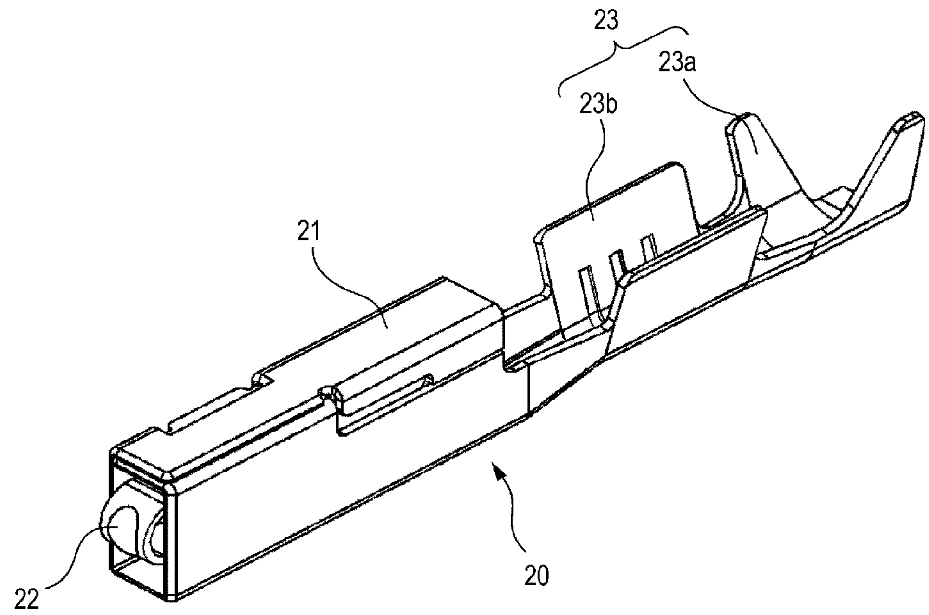
FIG. 3 is a perspective view of a terminal fitting used in the embodiment of the invention.
Figure 4:
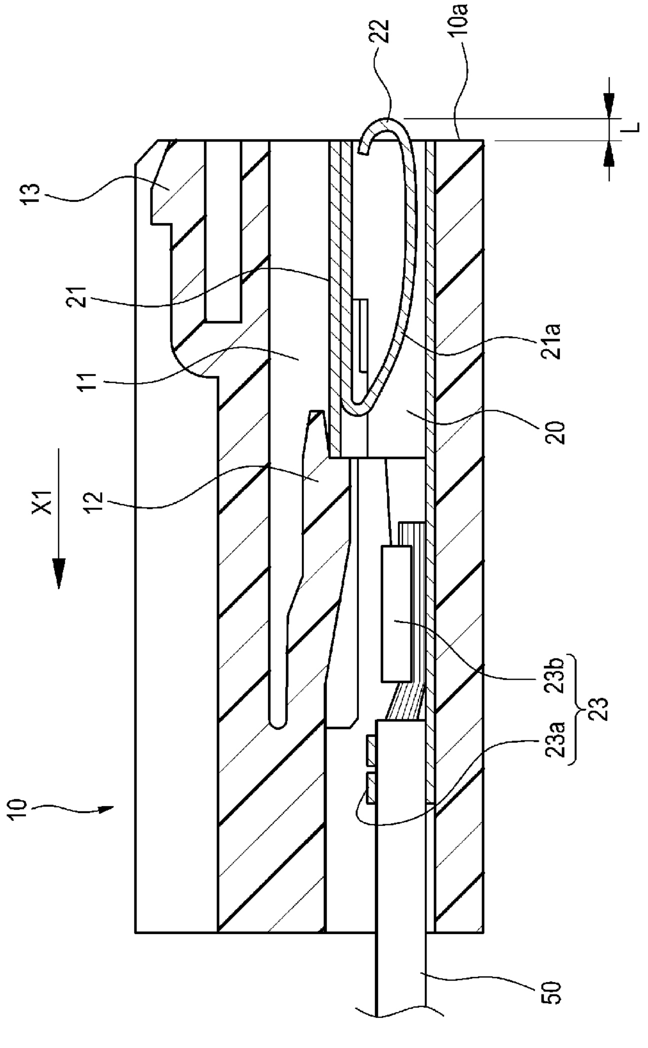
FIG. 4 is a longitudinally sectional view of a connector housing retaining the terminal fitting shown in FIG. 3.
Figure 5:
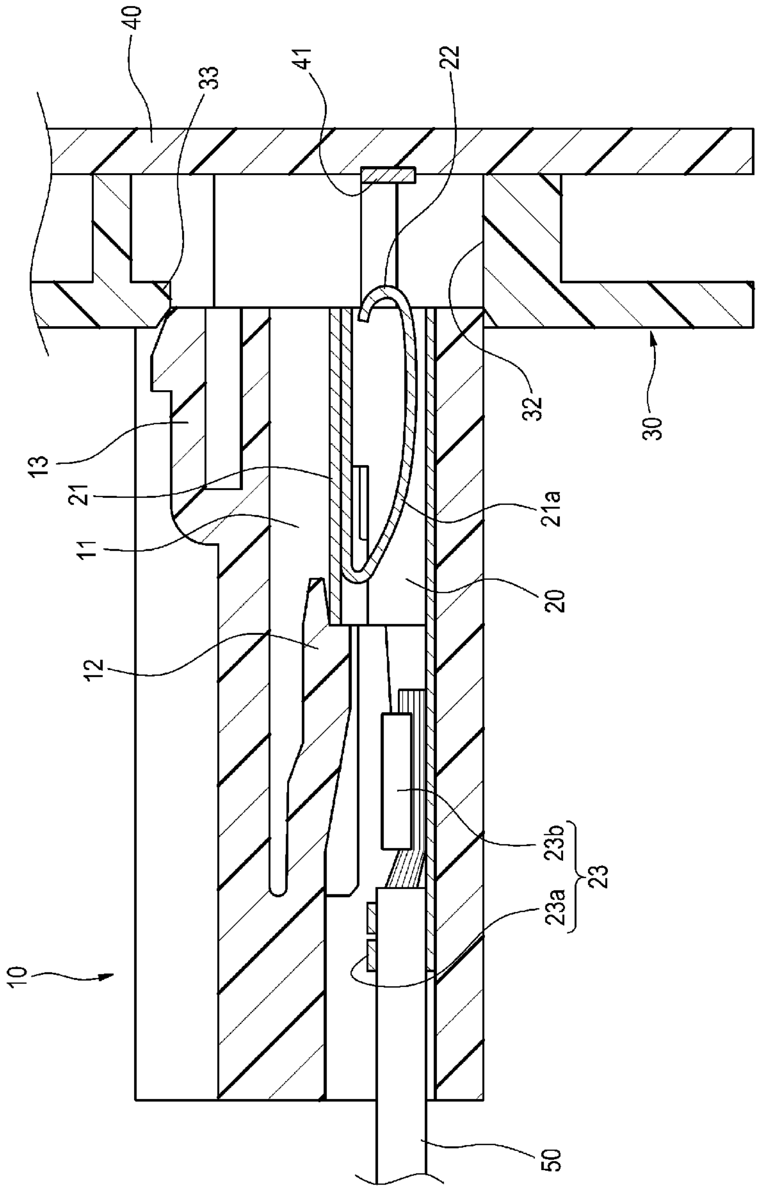
FIG. 5 is a longitudinally sectional view showing a state in which engagement between the housing engagement portion of the device casing shown in FIG. 1 and the connector housing has been started.
Figure 6:
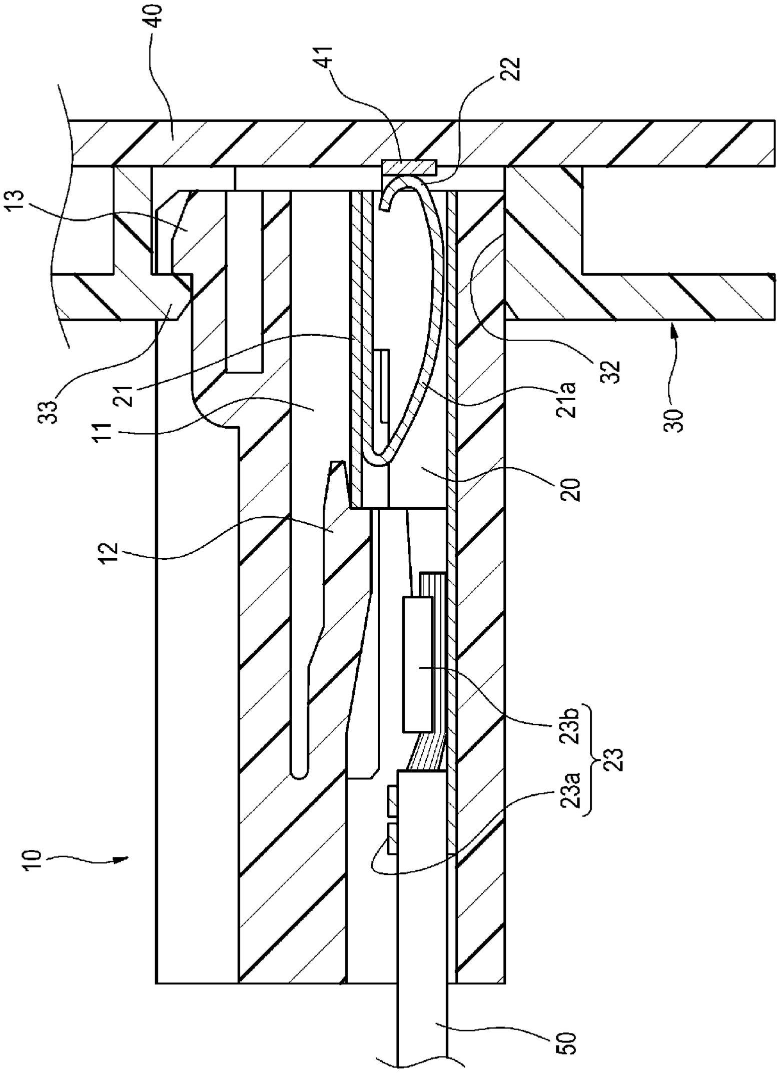
FIG. 6 is a longitudinally sectional view of a state in which the engagement between the housing engagement portion of the device casing shown in FIG. 1 and the connector housing has been completed so that good electric conduction can be obtained between the terminal fitting and an external input contact of the circuit substrate.
Figure 7:
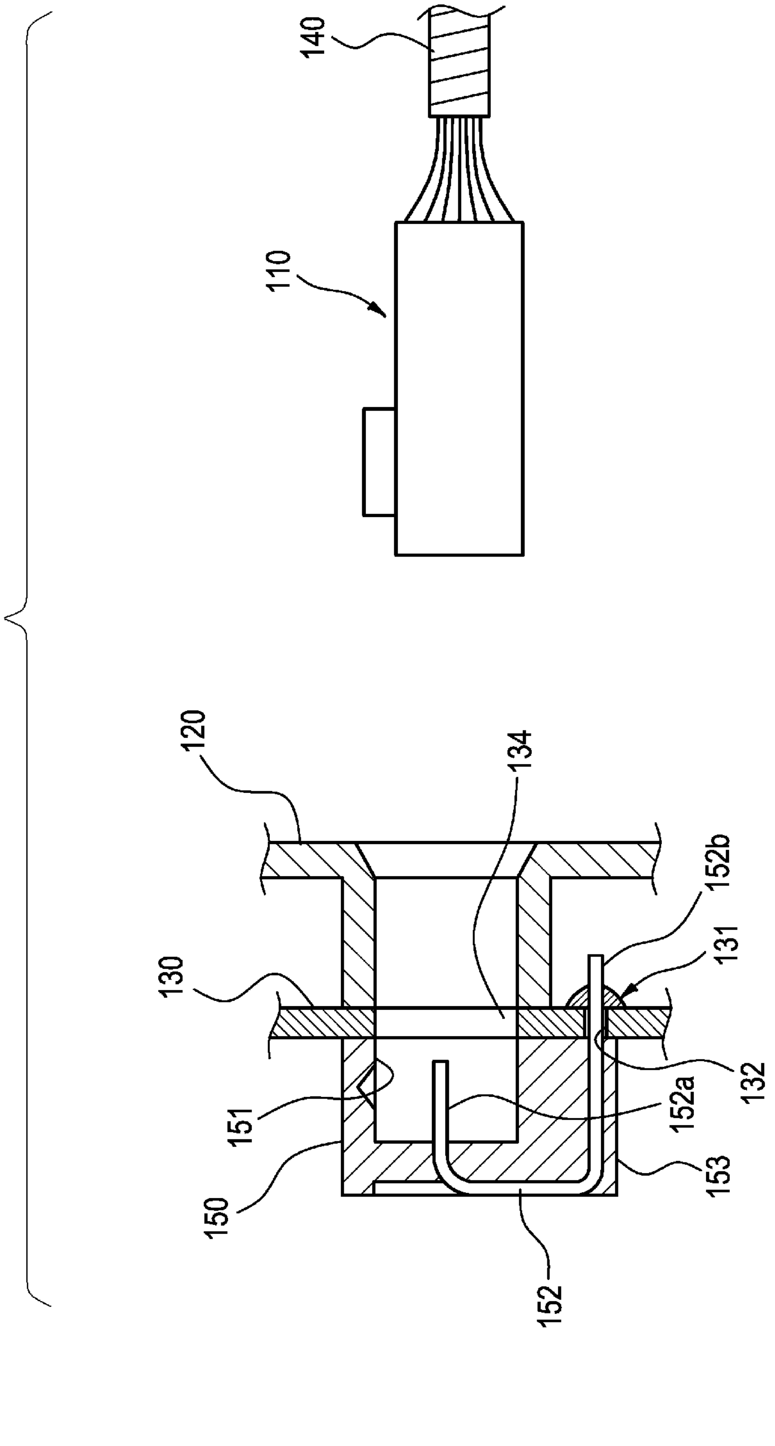
FIG. 7 is a view for explaining a background-art connecting structure for a terminal fitting and a substrate.

FIGS. 1 to 6 show an embodiment of a connecting structure for a terminal fitting and a substrate according to the invention. FIG. 1 is an exploded perspective view of the embodiment of a connecting structure for a terminal fitting and a substrate according to the invention. FIG. 2 is a front view of flat plate-like conductors of a circuit substrate facing a housing engagement portion of a device casing shown in FIG. 1. FIG. 3 is a perspective view of a terminal fitting used in the embodiment of the invention. FIG. 4 is a longitudinally sectional view of a connector housing retaining the terminal fitting shown in FIG. 3. FIG. 5 is a longitudinally sectional view showing a state in which engagement between the housing engagement portion of the device casing shown in FIG. 1 and the connector housing has been started. FIG. 6 is a longitudinally sectional view of a state in which the engagement between the housing engagement portion of the device casing shown in FIG. 1 and the connector housing has been completed so that good electric conduction can be obtained between the terminal fitting and an external input contact of the circuit substrate.

The connecting structure for a terminal fitting and a substrate according to the embodiment is a structure in which terminal fittings 20 retained in a connector housing 10 made of resin have electric conduction with flat plate-like conductors 41 serving as external input contacts of a circuit substrate 40 attached into a device casing 30 as shown in FIG. 5.

Each terminal fitting 20 is an integrated component formed by press molding of a metal plate. The terminal fitting 20 in the embodiment is provided with a terminal body portion 21 which has a shape like a substantially angular cylinder, a contact portion 22 which is provided to protrude from a front end portion of the terminal body portion 21, and an electric wire connection portion 23 which is provided in a rear end portion of the terminal body portion 21, as shown in FIG. 3.

As shown in FIG. 4, when the terminal body portion 21 of the terminal fitting 20 is inserted into a terminal reception hole 11 of the connector housing 10, a terminal lock lance 12 in the terminal reception hole 11 is engaged with a rear end portion of the terminal body portion 21 so that the terminal body portion 21 can be positioned in the terminal reception hole 11.

The contact portion 22 of the terminal fitting 20 is a part of a plate spring piece 21*a* which is formed integrally with the terminal body portion 21 of the terminal fitting 20, as shown in FIG. 4. The contact portion 22 is provided so that the contact portion 22 can be elastically displaced toward the rear end portion of the terminal fitting 20 (in the direction of the arrow X1 in FIG. 4) due to the elastic deformation of the plate spring piece 21*a* when the contact portion 22 abuts against the flat plate-like conductor 41.

The electric wire connection portion 23 is a portion to which an electric wire 50 is connected, for example, from a power supply circuit, a control circuit or the like disposed outside the device casing 30, as shown in FIG. 1.

The electric wire connection portion 23 is provided with a sheath caulking piece 23*a* which is caulked to a sheath portion of the electric wire 50 so as to fix the electric wire 50, and a conductor caulking piece 23*b* which is caulked to a conductor of the electric wire 50 so as to electrically connect the conductor with the terminal fitting 20, as shown in FIG. 3.

The connector housing 10 is provided with a plurality of terminal reception holes 11 which receive a plurality of terminal fittings 20, terminal lock lances 12 which are engaged with the terminal fittings 20 inserted into the terminal reception holes 11 so that the terminal fittings 20 can be prevented from being detached, and a lock piece 13 which is extended in the outside surface of the connector housing 10, as shown in FIG. 1 and FIG. 4.

Each terminal lock lance 12 is engaged with the rear end of the terminal body portion 21 in the corresponding terminal reception hole 11 so as to prevent the terminal fitting 20 from being detached, as shown in FIG. 4. In the connector housing 10, each terminal lock lance 12 prevents the corresponding terminal fitting 20 from being detached, so that the terminal fitting 20 can be retained in a position where the contact portion 22 of the terminal fitting 20 protrudes from a front end surface 10*a* of the connector housing 10 by a predetermined distance L.

When the connector housing 10 is fitted to the housing engagement portion 31 of the device casing 30 which will be described later, the lock piece 13 is engaged with a housing lock portion 33 provided in the housing engagement portion 31 so as to couple the connector housing 10 with the device casing 30.

In the device casing 30, the housing engagement portion 31 is formed in an outer wall portion 30*a* as shown in FIG. 1. The housing engagement portion 31 is provided with a hood portion 32 and the housing lock portion 33 as shown in FIG. 1 and FIG. 5.

The hood portion 32 is formed into a cylindrical structure which is fitted to the outer periphery of the connector housing 10, so as to restrict the insertion direction of the connector housing 10 in a direction substantially perpendicular to the surface of the circuit substrate 40.

When the contact portions 22 of the terminal fittings 20 abut against the flat plate-like conductors 41 with a set pressure due to the insertion of the connector housing 10 into the hood portion 32, the housing lock portion 33 is engaged with the lock piece 13 of the connector housing 10 so that the connector housing 10 can be fixed to the device casing 30, as shown in FIG. 6.

When the housing lock portion 33 of the housing engagement portion 31 which has been described above is engaged with the lock piece 13 so as to fix the connector housing 10 as shown in FIG. 6, the housing lock portion 33 positions the connector housing 10 so that the contact portions 22 of the terminal fittings 20 retained by the connector housing 10 can protrude inside the device casing 30.

The circuit substrate 40 is fixed into the device casing 30 so that the surface of the circuit substrate 40 can contact with the contact portions 22 protruding from the front end of the connector housing 10 positioned by the housing engagement portion 31 as shown in FIG. 6.

In addition, as shown in FIG. 2, on the circuit substrate 40, the flat plate-like conductors 41 serving as external input contacts are disposed in the positions the contact portions 22 abut against. In the embodiment, the flat plate-like conductors 41 consist of copper foil pasted to the surface of the circuit substrate 40. In addition, the flat plate-like conductors 41 are connected to a wiring circuit laid in the circuit substrate 40.

In the connecting structure for a terminal fitting and a substrate according to the embodiment, which has been described above, the contact portions 22 of the terminal fittings 20 abut against the surfaces of the flat plate-like conductors 41 so as to obtain electric conduction between the terminal fittings 20 and the flat plate-like conductors 41 serving as the external input contacts, as shown in FIG. 6.

According to the connecting structure according to the embodiment which has been described above, the terminal fittings 20 having electric conduction with the flat plate-like conductors 41 serving as the external input contacts of the circuit substrate 40 are retained in the connector housing 10. The connector housing 10 is positioned by the housing engagement portion 31 formed in the device casing 30.

The terminal fittings 20 in the connector housing 10 positioned by the housing engagement portion 31 of the device casing 30 achieve electric conduction with the external input contacts of the circuit substrate 40 (that is, the flat plate-like conductors 41) not in a male-female fitting manner but in such a manner that the contact portions 22 provided for butting in the front end portions of the terminal fittings 20 abut against the flat plate-like conductors 41 on the circuit substrate 40.

That is, according to the connecting structure according to the embodiment, troublesome work for mounting a substrate connector on the circuit substrate 40 can be dispensed with, and the substrate connector can be dispensed with. Accordingly it is possible to reduce constituent components or working steps. It is therefore possible to improve the productivity or reduce the manufacturing cost.

In addition, according to the connecting structure according to the embodiment, the electric connection between the terminal fittings 20 in the connector housing 10 and the flat plate-like conductors 41 serving as the external input contacts of the circuit substrate 40 is secured not in a male-female fitting manner which may cause twisting or the like but in a butting manner. Accordingly, the terminal fittings 20 can surely establish electric conduction with the external input contacts of the circuit substrate 40 without deformation caused by twisting or the like in the terminal fittings 20 during the work of connection.

In addition, according to the connecting structure according to the embodiment, the housing engagement portion 31 formed in the device casing 30 includes the hood portion 32 which restricts the insertion direction of the connector housing 10 in a direction substantially perpendicular to the surface of the circuit substrate 40. Accordingly, the contact portions 22 at the front ends of the terminal fittings 20 retained in the connector housing 10 can abut against the flat plate-like conductors 41 serving as the external input contacts on the circuit substrate 40, and substantially perpendicularly to the flat plate-like conductors 41. Thus, a stable butting state can be obtained.

In addition, the contact portion 22 of each terminal fitting 20 is a part of the plate spring piece 21*a* formed integrally with the terminal fitting 20. Due to the elastic deformation of the plate spring piece 21*a* at the time of the abutment, the contact portion 22 is not affected by dimensional tolerances or assembling errors, but can contact with the corresponding flat plate-like conductor 41 on the circuit substrate 40 with a stable pressure.

Accordingly, stable electric connection properties can be secured.

Incidentally, the invention is not limited to the aforementioned embodiment, but changes, improvements, etc. may be made thereon suitably. In addition, materials, shapes, dimensions, numbers, installation places, etc. of constituent elements in the aforementioned embodiment are not limited but may be selected desirably as long as the invention can be attained.

Although the invention has been described in detail and with reference to its specific embodiment, it is obvious for those skilled in the art that various changes or modifications can be made on the invention without departing from the spirit and scope thereof.

The present application is based on a Japanese patent application (Japanese Patent Application No. 2012-149673) filed on Jul. 3, 2012, the contents of which will be incorporated herein by reference.

INDUSTRIAL APPLICABILITY

According to a structure between a terminal fitting and a substrate according to the invention, troublesome work for mounting a substrate connector on a circuit substrate can be dispensed with and the substrate connector can be dispensed with. Accordingly, constituent components or working steps can be reduced to improve the productivity or reduce the manufacturing cost.

In addition, according to the structure between a terminal fitting and a substrate according to the invention, electric connection between a terminal fitting in a connector housing and an external input contact of the circuit substrate is secured in a butting manner. Accordingly, the terminal fitting can surely establish electric conduction with the external input contact of the circuit substrate without deformation caused by twisting or the like in the terminal fitting during the work of connection.

The invention showing the aforementioned effects is useful in the field of a connecting structure for a terminal fitting and a substrate.

Here, the features of the aforementioned embodiment of the connecting structure for a terminal fitting and a substrate according to the invention will be briefly summed and described in the following paragraphs [1] and [2].

[1] A connecting structure for a terminal fitting and a substrate, in which a terminal fitting (20) retained in a connector housing (10) has electric conduction with an external input contact (41) of a circuit substrate (40) attached into a device casing (30), the connecting structure including:

a contact portion (22) that is provided for butting so as to protrude from an front end portion of the terminal fitting (20) and which is received and retained in the connector housing (10) so as to protrude from a front end of the connector housing (10); and a housing engagement portion (31) that is formed in an outer wall portion of the device casing (30) and that positions the connector housing (10) so that the contact portion (22) protrudes into the device casing (30), wherein a flat plate-like conductor (41) of the circuit substrate (40) serving as the external input contact is disposed in the device casing (30) so that a surface of the flat plate-like conductor (41) abuts against the contact portion (22) protruding from the front end of the connector housing (10) positioned by the housing engagement portion (31).

[2] The connecting structure for a terminal fitting and a substrate according to the above paragraph [1], wherein the contact portion (22) of the terminal fitting (20) is a part of a plate spring piece (21*a*) formed integrally with the terminal fitting (20), and is provided so that the contact portion (22) can be elastically displaced toward a rear end portion of the terminal fitting (20) due to elastic deformation of the plate spring piece (21*a*) when the contact portion (22) abuts against the flat plate-like conductor (41); and wherein the housing engagement portion (31) of the device casing (30) includes a hood portion (32) and a housing lock portion (33), the hood portion (32) being formed into a cylindrical structure fitted to an outer periphery of the connector housing (10) so as to restrict an insertion direction of the connector housing (10) in a direction substantially perpendicular to the circuit substrate (40), and the housing lock portion (33) being engaged with the connector housing (10) to fix the connector housing (10) to the device casing (30) when the contact portion (22) of the terminal fitting (20) abuts against the flat plate-like conductor (41) with a set pressure due to insertion of the connector housing (10) into the hood portion (32).

DESCRIPTION OF REFERENCE NUMERALS AND SIGNS

10 connector housing
20 terminal fitting
21*a* plate spring piece
22 contact portion
30 device casing
30*a* outer wall portion
31 housing engagement portion
32 hood portion
33 housing lock portion
40 circuit substrate
41 flat plate-like conductor (external input contact)

The invention claimed is:

1. A connecting structure for a terminal fitting and a substrate, in which a terminal fitting retained in a connector housing has electric conduction with an external input contact of a circuit substrate attached into a device casing, the connecting structure comprising:

a hollow terminal body portion forming a portion of the terminal fitting;

a contact portion that is provided for butting so as to protrude in a front end portion of the terminal body portion and that is received and retained in the connector housing so as to protrude from a front end of the connector housing;

a spring piece connected to the terminal body portion, connected to the contact portion and extending through the terminal body portion; and a housing engagement portion that is formed in an outer wall portion of the device casing and that positions the connector housing so that the contact portion protrudes into the device casing, wherein a flat plate-like conductor of the circuit substrate serving as the external input contact is disposed in the device casing so that a surface of the flat plate-like conductor abuts against the contact portion protruding from the front end of the connector housing positioned by the housing engagement portion.

2. The connecting structure for a terminal fitting and a substrate according to claim 1, wherein the contact portion of the terminal fitting is a part of a plate spring piece formed integrally with the terminal fitting, and is provided so that the contact portion can be elastically displaced toward a rear end portion of the terminal fitting due to elastic deformation of the plate spring piece when the contact portion abuts against the flat plate-like conductor; and wherein the housing engagement portion of the device casing includes a hood portion and a housing lock portion, the hood portion being formed into a cylindrical structure fitted to an outer periphery of the connector housing so as to restrict an insertion direction of the connector housing in a direction substantially perpendicular to the circuit substrate, and the housing lock portion being engaged with the connector housing to fix the connector housing to the device casing when the contact portion of the terminal fitting abuts against the flat plate-like conductor with a set pressure due to insertion of the connector housing into the hood portion.

* * * * *